Dec. 16, 1952        R. F. HEINJE        2,621,778
EQUALIZING MECHANISM FOR FEED ROLLERS
Filed Oct. 26, 1950
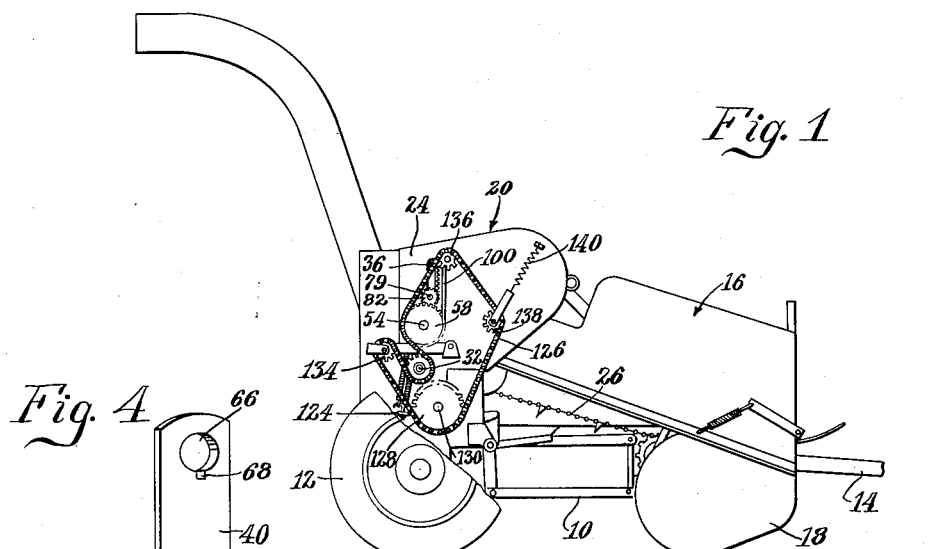
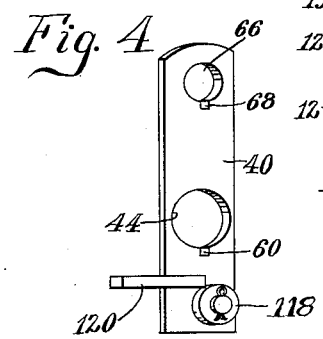
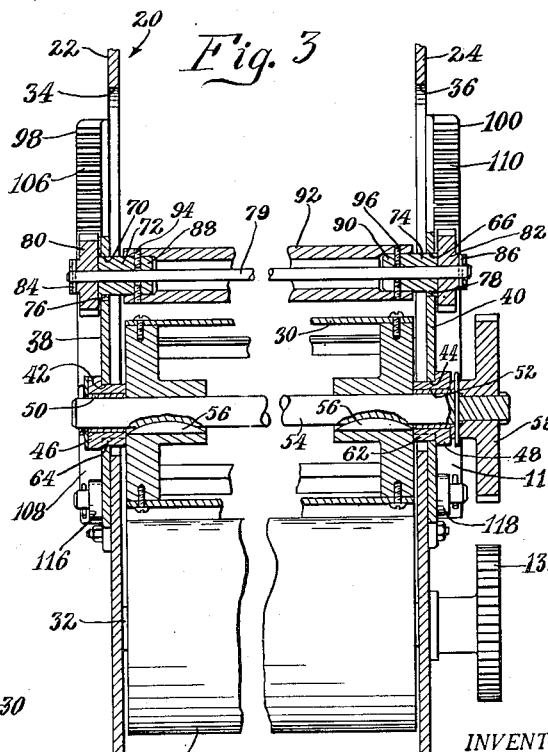
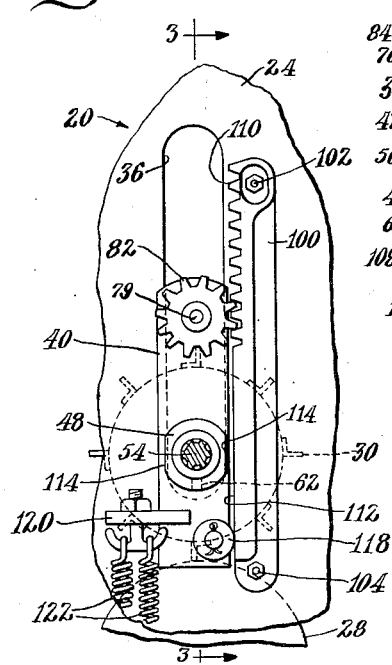
INVENTOR.
R. F. Heinje
BY
Attorneys Patented Dec. 16, 1952

2,621,778

UNITED STATES PATENT OFFICE 2,621,778

EQUALIZING MECHANISM FOR FEED ROLLERS

Robert F. Heinje, Ottumwa, Iowa, assignor to Deere Manufacturing Co., Dubuque, Iowa, a corporation of Iowa Application October 26, 1950, Serial No. 192,322

4 Claims. (Cl. 198—127)

1

This invention relates to an agricultural machine and more particularly to such machines of the harvester type. Still more specifically, the invention pertains to improvements in the handling of crops in harvesters of the type commonly called field forage harvesters.

In machines of the general character referred to above, crops are gathered from the field by either of two methods: In one, the crops are cut or harvested and immediately gathered or picked up; in the other, the crops have been previously cut and are picked after an interval in which the crops are allowed to cure on the ground. In either case, the crops are ultimately transferred from the gathering means or unit to a crop-receiving unit in which there are feed rolls or equivalents thereof for ultimately transferring the crops to reducing mechanism such as a rotating flywheel having chopping knives or the like thereon. It is conventional, of course, as set forth above to utilize feed rolls for effecting the transfer of crops from the gathering unit to the reducing or comminuting unit. Because of the variation in the quantity of crops in the stream being fed through the feed rolls, one of the feed rolls must be mounted movably relative to the other. These feed rolls are normally mounted on parallel transverse axes and therefore the relative movement is vertical. It is important that the parallelism of the feed rolls be maintained during relative movement therebetween and various mechanisms have heretofore been resorted to to overcome the tendency of one end of the feed roll to rise or descend in advance of the other, thus causing cocking of the movable feed roll and ultimately resulting in damage thereto.

According to the invention, equalizing means is provided for equalizing movement of the movable feed roll so that parallelism between the feed rolls is maintained at all times during relative movement. Specifically, it is a feature of the invention to provide simple and efficient equalizing means, comprising primarily a pair of toothed racks provided at opposite ends of the movable feed roll and along the paths through which these ends move; and a pair of pinions are disposed in constant mesh respectively with the racks, the pinions being interconnected by a shaft so that they are caused to rotate together. Hence, any tendency of one end of the feed roll to rise or descend in advance of the other is impossible, since movement of opposite ends of the feed roll will be coordinated or equalized. It is a further feature of the invention to provide

2 the equalizing means in association with a novel and improved construction and feed roll mounting, wherein the equalizing means includes a carrier in which the movable feed roll is journaled, together with means in each carrier serving to guide the carrier and the movable feed roll during its upward and downward movement relative to the other feed roll. A further feature of the invention resides in the cooperation between a roller on one of the carriers and an untoothed portion on one of the racks providing cooperating guide means for stabilizing movement of the carrier on which the roller is provided. Because of the interconnection between the carriers by virtue of the pinions and connecting shaft, the stabilization is carried from one end of the feed roll to the other.

The foregoing and other important objects and desirable features inherent in and encompassed by the invention will become apparent as the disclosure of a preferred embodiment thereof is made in the following detailed description and accompanying sheet of drawings, wherein:

Figure 1 is a side elevational view of a typical forage harvester, portions of the external shielding at the near side of the machine being broken away to expose certain parts of the operating mechanism;

Figure 2 is an enlarged fragmentary view of one side of the equalizing means and its relationship to the upper and lower feed rolls;

Figure 3 is a transverse sectional view taken substantially on the line 3—3 of Figure 2; and Figure 4 is a perspective detail view of one of the carriers.

The harvester selected for the purposes of disclosure in the instant case is somewhat similar to that shown in U. S. Patent 2,493,918. Familiarity with the details of machines of this character will be assumed and many details are considered unimportant and for that reason have not been illustrated and will not be described.

The machine comprises in general a mobile carriage or frame 10 carried on a pair of wheels 12 (only one of which appears in the drawings) and adapted to travel forwardly over a field of crops, being preferably drawn behind a tractor or similar vehicle (neither of which is shown) by means of a draft device 14. The machine includes at one side and at a forward portion thereof a crop-gathering unit designated generally by the numeral 16. A portion of this unit comprises, in the present instance, pick-up means 18 for gathering from the field crops that have been previously cut and allowed to lie on the ground to cure. The machine in the respect just described may be largely conventional.

The carriage 10 supports rearwardly of the crop-gathering unit 16 a crop-receiving unit, designated generally by the numeral 20, in the form of a housing having upright side walls 22 and 24 spaced apart transversely with respect to the direction of travel of the machine and lying respectively in planes parallel to said direction of travel. The gathering unit 16 includes a rearwardly moving conveyor chain 26 which feeds crops to the crop-receiving housing or unit 20 and more specifically to and between first and second or lower and upper feed rolls 28 and 30. The lower roll 28 is preferably a smooth roll and is carried on a transverse shaft 32 which in turn is journaled at its opposite ends respectively in the upright side walls 22 and 24, the axis of rotation of this feed roll being therefore transverse to the direction of travel of the harvester carriage.

The upright side wall 22 is formed with or has means providing therein an upright slot 34. The other side wall 24 has a similar slot 36. Each slot is, in the present case, straight and extends upwardly from the lower feed roll. The slots are, of course, transversely alined.

The slots 34 and 36 serve respectively to mount carriers 38 and 40. One of the carriers (40) is shown by itself in Figure 4. Each carrier is preferably in the form of a flat strip of steel of appropriate strength and other characteristics and is provided with means to be presently described for mounting the upper feed roll and for carrying part of the equalizer means. The carrier 38 is provided intermediate its ends with a circular opening 42; and the carrier 40 has a similar circular opening 44. The carriers are respectively associated alongside the slots 34 and 36 and, when so positioned, the circular openings 42 and 44 are coaxial. These openings respectively carry members 46 and 48 which respectively have internal surface portions providing bearings 50 and 52 for journaling opposite ends of a transverse shaft 54 on which the upper feed roll 30 is mounted. The mounting of the upper feed roll on the shaft 54 is such that the two are constrained for rotation together. As illustrated, keys 56 may be utilized for this purpose. The right-hand end of the shaft 54 projects outwardly through its carrying or supporting member 44 and has fixed thereto a driving sprocket 58.

The feed rolls 28 and 30 are located wholly within the side walls 22 and 24; and the carriers 38 and 40 are located wholly outside these walls. The carrier 40 is provided with a notch 60 extending radially from its central circular opening 44. A lug 62 on the member 48 cooperates with this notch to secure the member 48 non-rotatably in the carrier. A similar construction is present between the other member 46 and its carrier 38, as designated at 64.

The upper end of the carrier 40 has a circular opening 66 which is formed with a radial notch 68. The other carrier 38 is identical in this respect, as designated by the numeral 70 in Figure 3. The carriers respectively support at their upper ends coaxial bearing members 72 and 74 which are provided respectively with lugs 76 and 78 cooperating with the notched openings 66 and 70 so that the members are non-rotatably supported. Each of these members is centrally bored and a transverse shaft 79 is passed therethrough. This shaft projects respectively at its opposite ends beyond the carriers 38 and 40 and these opposite ends are provided respectively with parts of the equalizing means comprising a pair of pinions 80 and 82. These pinions are respectively fixed to the ends of the shaft 79 as by pins 84 and 86.

Each of the members 72 and 74 extends inwardly of the carriers and side walls as designated respectively by the numerals 88 and 90. A tubular spacer 92 surrounds the shaft 79 and the member portions 88 and 90, to serve as a spacer therebetween. The tubular member is fixed at 94 and 96 to the member portions 88 and 90.

Other parts of the equalizing means consist of a pair of toothed rack 98 and 100. These are secured respectively to the outsides of the upright walls 22 and 24, as by bolts 102 and 104 (Figure 2). The rack 98 includes a toothed portion 106 and an untoothed guide portion 108. The rack 100 has corresponding portions 110 and 112. The toothed portions 106 and 110 respectively of the racks 98 and 100 are in constant mesh respectively with the pinions 80 and 82. Since the pinions are interconnected by the cross shaft 79, the pinions must rotate in unison. Therefore, as the upper feed roll moves vertically relative to the lower feed roll, it is guided by the slots 34 and 36 and equalized by the pinion 80 and rack 98 and pinion 82 and rack 100.

As further means for guiding the upward movement of the carrier and upper feed roll assembly, opposite sides of the members 46 and 48 are flattened as shown at 114 in Figure 2. As a further adjunct to the guiding and stabilization of the carriers during their upward movement, the carriers may be provided respectively with guide rollers 116 and 118 which cooperate respectively with the untoothed portions 112 and 114 of the racks 98 and 100. In some cases, it will be found that one of the stabilizing rollers may be omitted, because the two sides of the equalizing means are tied together by the transverse shaft 79.

The right-hand carrier 40 is provided with an apertured ear or lug 120 which provides means for connecting the upper ends of a pair of tension springs 122. The lower ends of these springs may be connected to a portion of the main frame 10, as indicated at 124 in Figure 1. The other carrier may be provided with similar springs. These springs serve as resilient means to urge the upper feed roll downwardly into engagement with the lower feed roll, the springs being, of course, yieldable upwardly to accommodate different thicknesses of streams of crops passing between the feed rolls.

The drive for the feed rolls includes a flexible endless driving element, here a chain 126. Power is taken from a sprocket 128 keyed to a power shaft 130. The shaft 130 derives its power in the first instance from any suitable means, such as an internal combustion engine mounted on the carriage or frame 10 or by means of a power take-off shaft connected to the tractor, neither of which such medium is illustrated, since both are conventional.

The shaft 32 for the lower feed roll 28 has keyed thereto a sprocket 132. The chain 126 is trained about the sprockets 128, 132 and 58 and also about a plurality of idler sprockets 134, 136 and 138. The idler sprockets 134 and 136 may be fixed. The idler sprocket 138 is resiliently mounted by means of a tension spring 140 to accommodate the changes in position of the upper feed roll as it moves relative to the lower feed roll.

The equalizing means combines simple construction and efficiency. It provides not only for the mounting and interconnection of the pinions 80 and 82 but also bearing means for the mounting of the upper feed roll 30.

Other advantages and desirable features not specifically enumerated herein will undoubtedly occur to those versed in the art, as likewise will numerous modifications and alterations of the preferred embodiment of the invention illustrated, all of which may be achieved without departing from the spirit and scope of the invention as defined in the appended claims.

What is claimed is:

1. In crop-feeding mechanism for a harvester or like machine of the type including a feed housing made up of a pair of transversely spaced apart upright side walls formed respectively with transversely alined upright guide slots, and a lower feed roll journaled between the side walls for rotation on a fixed transverse axis at a level below the bottoms of the slots, the improvement comprising: a pair of carriers, one for each slot and each having a midportion normally adjacent to the bottom of its slot, a lower portion normally projecting downwardly beyond the bottom of its slot and an upper portion normally midway between the bottom and top of its slot; a first pair of bearings mounted respectively on the midportions of the carriers and coaxial on a transverse axis through the slots and above and parallel to the lower feed roll axis, said first bearings having internal bearing surfaces and external bearing surfaces, said external surfaces respectively riding on those portions of the side walls that respectively define upright edges of the slots to guide the carriers and bearings for free floating vertical movement within the limits of the slots; an upper feed roll between the side walls and having opposite ends journaled in the internal bearing surfaces of said first bearings so that said upper feed roll may float vertically with the carriers and relative to the lower feed roll; a second pair of bearings mounted respectively on the upper portions of the carriers and coaxial on a transverse axis through the slots and above and parallel to the upper feed roll axis; transverse, freely rotatable shaft means journaled in the second bearings and projecting respectively at opposite ends outwardly beyond said second bearings; a pair of pinions secured respectively to the opposite ends of said shaft means; a pair of racks, one disposed upright along one edge of each slot and having an upper toothed part meshing with and extending upwardly from the respective pinion and a lower untoothed part free of and extending downwardly from the respective pinion toward the lower portion of the respective carrier; and guide roller means carried by the lower portion of at least one carrier and engaging the untoothed portion of the respective rack.

2. The invention defined in claim 1, in which: each of the second bearings projects inwardly through its slot; and a tubular cross-member encloses the shaft means and has its opposite ends secured respectively to said second bearings to fix the transverse spacing between said second bearings.

3. The invention defined in claim 2, in which: at least one of the second bearings is held against rotation relative to its carrier and the tubular cross-member is rigidly secured to said one second bearing and is likewise held against rotation relative to the carrier.

4. In crop-feeding mechanism for a harvester or like machine of the type including a feed housing made up of a pair of transversely spaced apart upright side walls formed respectively with transversely alined upright guide slots, and a lower feed roll journaled between the side walls for rotation on a fixed transverse axis at a level below the bottoms of the slots, the improvement comprising: a pair of carriers, one for each slot and each having a first portion normally adjacent to the bottom of its slot and a second portion normally midway between the bottom and top of its slot; a first pair of bearings mounted respectively on the first portions of the carriers and coaxial on a transverse axis through the slots and above and parallel to the lower feed roll axis, said first bearings having internal bearing surfaces and external bearing surfaces, said external surfaces respectively riding on those portions of the side walls that respectively define upright edges of the slots to guide the carriers and bearings for free floating vertical movement within the limits of the slots; an upper feed roll between the side walls and having opposite ends journaled in the internal bearing surfaces of said first bearings so that said upper feed roll may float vertically with the carriers and relative to the lower feed roll; a second pair of bearings mounted respectively on the second portions of the carriers and coaxial on a transverse axis through the slots and above and parallel to the upper feed roll axis; transverse, freely rotatable shaft means journaled in the second bearings and projecting respectively at opposite ends outwardly beyond said second bearings; a pair of pinions secured respectively to the opposite ends of said shaft means; and a pair of racks, one disposed upright along one edge of each slot and having an upper toothed part meshing with and extending upwardly from the respective pinion and a lower untoothed part free of and extending downwardly from the respective pinion toward the lower portion of the respective carrier.

ROBERT F. HEINJE.

REFERENCES CITED

The following references are of record in the file of this patent:

UNITED STATES PATENTS

| Number | Name | Date |
|--------|------|------|
| 162,637 | Fawcett | Apr. 27, 1875 |
| 170,140 | Whitney | Nov. 16, 1875 |
| 757,614 | Hamachek | Apr. 19, 1904 |
| 1,213,192 | Heebner | Jan. 23, 1917 |
| 2,439,259 | McCormack | Apr. 6, 1948 |